(12) United States Patent
Dahl et al.

(10) Patent No.: US 8,681,585 B2
(45) Date of Patent: Mar. 25, 2014

(54) MULTI-RANGE OBJECT LOCATION ESTIMATION

(75) Inventors: Tobias Dahl, Oslo (NO); Geir Birkedal, Oslo (NO); Bjorn Cato Syversrud, Oslo (NO)

(73) Assignee: Elliptic Laboratories AS, Oslo (NO)

( * ) Notice: Subject to any disclaimer, the term of this patent is extended or adjusted under 35 U.S.C. 154(b) by 669 days.

(21) Appl. No.: 12/936,175

(22) PCT Filed: Apr. 6, 2009

(86) PCT No.: PCT/GB2009/000901
§ 371 (c)(1),
(2), (4) Date: Dec. 22, 2010

(87) PCT Pub. No.: WO2009/122193
PCT Pub. Date: Oct. 8, 2009

(65) Prior Publication Data
US 2011/0103448 A1     May 5, 2011

(30) Foreign Application Priority Data
Apr. 4, 2008 (GB) .................................. 0806196.2

(51) Int. Cl.
*G01S 15/00* (2006.01)
*G01S 15/88* (2006.01)
(52) U.S. Cl.
CPC ..................................... *G01S 15/88* (2013.01)
USPC ......................................................... 367/99
(58) Field of Classification Search
USPC ......................................................... 367/99
See application file for complete search history.

(56) References Cited

U.S. PATENT DOCUMENTS

| | | | |
|---|---|---|---|
| 5,059,959 A | 10/1991 | Barry | |
| 7,002,876 B2 | 2/2006 | Komai et al. | |
| 8,305,843 B2 * | 11/2012 | Dahl et al. | 367/96 |
| 8,531,916 B2 * | 9/2013 | Dahl et al. | 367/96 |
| 2005/0018539 A1 | 1/2005 | Komai et al. | 367/99 |
| 2007/0071077 A1 * | 3/2007 | Yang | 375/218 |
| 2007/0076726 A1 * | 4/2007 | Weston et al. | 370/401 |
| 2007/0121097 A1 | 5/2007 | Boillot | |
| 2008/0018502 A1 * | 1/2008 | Wegener | 341/50 |
| 2011/0096954 A1 * | 4/2011 | Dahl | 382/103 |
| 2012/0099403 A1 * | 4/2012 | Dahl et al. | 367/135 |
| 2013/0094329 A1 * | 4/2013 | Dahl et al. | 367/95 |

FOREIGN PATENT DOCUMENTS

WO    WO 2006/067436 A1    6/2006

OTHER PUBLICATIONS

Holmberg, P., Robust ultrasonic range finder—an FFT analysis, Measurement Science and Technology, vol. 3, No. 11, 1992, pp. 1025-1037.

Klahold et al., Continuous Sonar Sensing for Mobile Mini-Robots, Proceedings 2002 IEEE International Conference on Robotics and Automation, Washington, DC, May 2002, vol. 1, 2002, pp. 323-328.

(Continued)

*Primary Examiner* — Isam Alsomiri
*Assistant Examiner* — James Hulka
(74) *Attorney, Agent, or Firm* — Knobbe Martens Olson & Bear LLP

(57) ABSTRACT

Estimating the impulse response of a channel by providing an initial signal (20); applying a time-shift function to the initial signal (20) to produce a transmit signal (36); transmitting the transmit signal (36); receiving a received signal; calculating an impulse response from the received signal as if the received signal had been produced by the initial signal; and using the impulse response to distinguish between received signals arising from reflections from objects (6) at different ranges.

33 Claims, 3 Drawing Sheets

(56) References Cited

OTHER PUBLICATIONS

Webb et al., Suppression of second-time-around echoes in high firing rate ultrasonic transducers, NDT&E International, vol. 28, No. 2, 1995, pp. 89-93.

International Search Report and Written Opinion dated Aug. 14, 2009 in International Application No. PCT/GB2009/000901, filed Apr. 6, 2009.

* cited by examiner

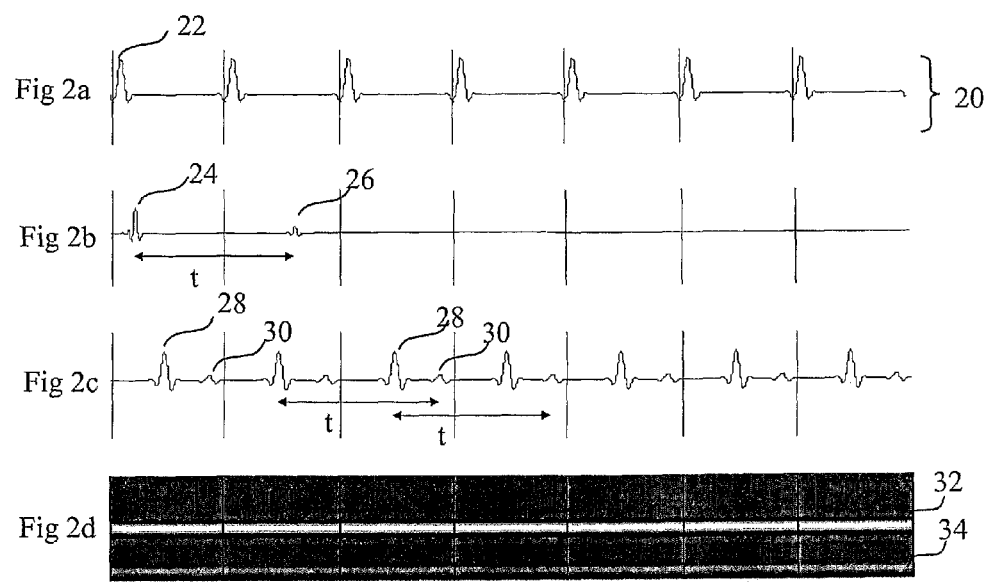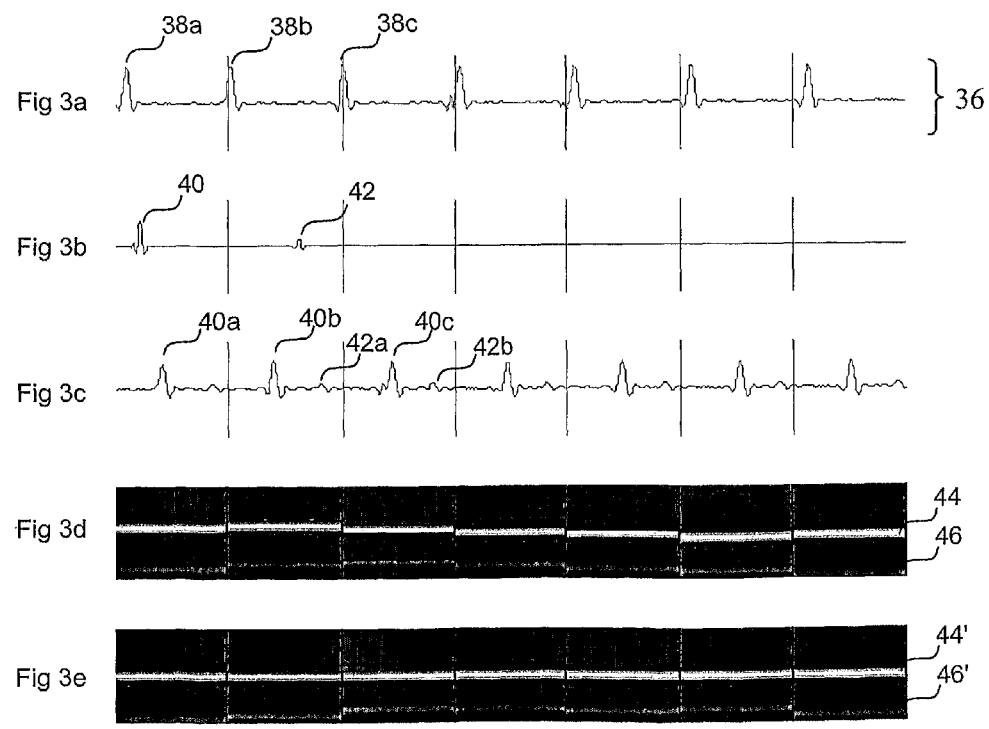

MULTI-RANGE OBJECT LOCATION ESTIMATION

RELATED APPLICATIONS

This application is a National Phase of PCT/GB2009/000901, filed Apr. 6, 2009, which was published in English and designated the U.S. and claims priority to GB 0806196.2, filed Apr. 4, 2008 each of which is incorporated herein by reference in its entirety.

This invention relates to locating and/or tracking the movements of one or more objects in a space. It relates particularly, although not exclusively, to tracking the movements of a hand; and to performing location/tracking of the objects using ultrasound signals.

There are many applications where it is useful to be able to locate or track the movement of an object within a space. This could be for example tracking the movements of people or objects in a room or building, or a more limited space such as tracking the movements of a hand and fingers in front of a computer or other electronic device.

One way of performing such location/tracking using ultrasound is to emit an ultrasonic burst of energy from a transducer, receive the echo bouncing off an object using one or more sensors, and compute the time-delay between emission and reception. The ultrasonic signal might be a spike or a chirp of increasing or decreasing frequencies. The emitted signal and echoes can be used to estimate the 'channel impulse response', that is the response in terms of echoes produced by the environment ('the channel') encountered by the ultrasound burst. If the emitted signal were a pure impulse, then the received signal would be the impulse response. However if the emitted signal is not such a theoretical pulse (but rather a chirp, for example), the channel impulse response can be calculated from the received signal, using knowledge of the actual emitted signal, to work out what the response would have been had a hypothetical instantaneous pulse been used.

In its simplest manifestations the impulse response estimation method referred to above is carried out under the 'send-receive-wait' principle. As the name suggests a deliberate delay is used (the 'wait') so that the receiver can be certain that all the received signals were generated from the single transmission.

A drawback of the 'send-receive-wait' principle is that the update frequency of the distance measurement process (i.e. the frame rate) is limited. If an attempt is made simply to make transmissions more frequently, problems arise when a new transmission is emitted before all echoes from previous transmission (above a certain energy threshold) have been received, as there will then be a blur of old and new echoes, making it more difficult precisely to estimate the correct time delay.

On the other hand, a limited update rate limits the speed of motion which can be detected in tracking systems.

There have been proposals for overcoming the above-mentioned problem.

One proposal, described in U.S. Pat. No. 5,059,959, uses a repeated series of relatively short pulses to calculate the distance to a hand using a basic time-of-flight principle. It recognises the problem of echoes from fixed objects such as walls or ceilings arriving 'around-the-timebase' and so interfering with echoes from the hand being tracked. It seeks to overcome this by altering or 'dithering' the interval between successive pulses and averaging the amplitude of the return signals over several pulses. The Applicant has recognised that this has the effect of 'smearing' around-the-timebase echoes from fixed objects across the echoes of interest, which may swamp the signal of interest. This may be especially problematic when such around-the-timebase echoes from fixed objects are stronger than the echoes from an object whose motion is to be determined, as can often be the case when an object of interest is a finger but a larger surface such as a wall or a human torso is located behind the finger. The use of short pulses can also provide an unfavourable general signal-to-noise ratio since, for a given amplifier, a longer signal can contain more energy than a short pulse.

Another proposal for overcoming the above problem is described in more detail in "Continuous sonar sensing for mobile mini-robots", Robotics and Automation, 2002. Proceedings. ICRA '02. IEEE International Conference on, Volume: 1, 2002; pages 323-328. This uses a continuous transmission and employs cross-correlation between the sent and received signals. Successful cross-correlation requires orthogonal codes to be employed. These have the property that, in theory at least, the echoes from different codes can be distinguished from one another by correlating with the transmitted codes at the receiver side. However there are problems with this approach. One problem is the difficulty of producing or reproducing sufficiently different codes; it is in practice impossible to produce a continuous sequence of perfectly orthogonal codes, so there is a certain level of cross-talk, or residual energy, even after cross-correlation. This is of increasing significance as attempts are made to detect echoes from long distances, since the residual cross-talk energy in echoes received from objects (or direct sonic paths) with short ranges will tend to drown completely echoes from the object of interest.

The technique of continuous inversion disclosed in our earlier WO 2006/067436 can be used to avoid the need for orthogonal codes. Nonetheless there remain some circumstances where an alternative method would be preferable and it is an object of the invention to provide such an alternative method.

When viewed from a first aspect the invention provides a method of estimating the impulse response of a channel comprising:
  providing an initial signal;
  applying a time-shift function to said initial signal to produce a transmit signal;
  transmitting said transmit signal;
  receiving a received signal;
  calculating an impulse response from said received signal as if the received signal had been produced by the initial signal; and
  using said impulse response to distinguish between received signals arising from reflections from objects at different ranges.

The invention extends to apparatus for estimating the impulse response of a channel comprising:
  means for providing an initial signal;
  means for applying a time-shift function to said initial signal to produce a transmit signal;
  a transmitter adapted to transmit said transmit signal;
  a receiver adapted to receive a received signal;
  means for calculating an impulse response from said received signal as if the received signal had been produced by the initial signal; and
  using said impulse response to distinguish between received signals arising from reflections from objects at different ranges The invention also extends to a computer software product, and a carrier bearing the same, configured, when run on a computer, to estimate the impulse response of a channel comprising: logic arranged to control a signal generator to provide an initial signal and apply a time-shift function to said initial signal to produce a transmit signal;

logic arranged to control a transmitter to transmit said transmit signal; an input adapted to receive a received signal from a receiver; logic adapted to calculate an impulse response from said received signal as if the received signal had been produced by the initial signal; and logic adapted to use said impulse response to distinguish between received signals arising from reflections from objects at different ranges.

Thus it will be seen by those skilled in the art that rather than 'conventional' impulse response estimation, the impulse responses are altered by the application of the time-shift function to the transmitted signals. The effect of the time-shift function to these impulse responses will be different for reflections from different ranges because of the differing times of flight. So even for reflections arriving at the receiver at similar times, the impulse responses can be distinguished since those arriving from further away will have had a different part of the time shift function applied from those arriving from closer. It should be appreciated that by using the time shift function, rather than say orthogonal codes, to distinguish between different echoes can be beneficial since the unwanted echoes remain confined to a relatively few impulse response 'taps' and so relatively easier to detect and disregard. By contrast, using 'orthogonal' codes, which are not perfectly orthogonal for most relevant code lengths, would result in residual cross-correlation artefacts which spread the problem across a larger number of taps. This is particularly important in situations where the unwanted echo my have a much greater energy than that from the object of interest. In a non-limiting example, when tracking a finger, the reflection from the finger tip will be orders of magnitude weaker than that from the torso, or a nearby wall, or the direct path (unreflected) signal.

Calculating an impulse response from the received signal as if the received signal had been produced by the initial signal is also quite different from merely averaging the raw signal over time and enables accurate discrimination between the reflections from objects at different ranges. The problem with averaging is similar to that with orthogonal codes: the unwanted echoes end up being smeared and so less well defined and identifiable. Another disadvantage with simplistic averaging of the raw signal resulting from short pulses is that it risks cancelling out a wanted part of the signal where consecutive pulses are shifted relative to one another such that they are mutually out-of-phase with each other. The Applicant has found that using longer signals and calculating impulse responses can provide a better signal-to-noise ratio and better echo discrimination than such prior art methods.

Preferably the received signal is used to calculate a distance to an object of interest.

When viewed from a second aspect the invention provides a method of locating or tracking an object of interest comprising:

providing an initial signal applying a time-shift function to said initial signal to produce a transmit signal transmitting said transmit signal;

receiving a plurality of received signals including a first received signal arising from reflection of said transmit signal from said object of interest and a second received signal not arising from reflection of said transmit signal from said object of interest and having a different time of flight to the first received signal;

using the time-shift function to distinguish between said first and second received signals; and using the first received signal to calculate a distance to said object of interest.

The invention extends to apparatus for locating or tracking an object of interest comprising:

means for providing an initial signal means for applying a time-shift function to said initial signal to produce a transmit signal a transmitter arranged to transmit said transmit signal;

a receiver arranged to receive a plurality of received signals including a first received signal arising from reflection of said transmit signal from said object of interest and a second received signal not arising from reflection of said transmit signal from said object of interest and having a different time of flight to the first received signal; and processing means arranged to use the time-shift function to distinguish between said first and second received signals and use the first received signal to calculate a distance to said object of interest.

The invention also extends to a computer software product, and a carrier bearing the same, configured, when run on a computer, locate or track an object of interest said software comprising: logic arranged to control a signal generator to provide an initial signal and apply a time-shift function to said initial signal to produce a transmit signal; logic arranged to control a transmitter to transmit said transmit signal; an input adapted to receive a plurality of received signals from a receiver including a first received signal arising from reflection of said transmit signal from said object of interest and a second received signal not arising from reflection of said transmit signal from said object of interest and having a different time of flight to the first received signal; and logic adapted to use the time-shift function to distinguish between said first and second received signals and use the first received signal to calculate a distance to said object of interest.

In such embodiments processing could be carried out in the impulse response domain either exclusively or as well as processing in the raw signal domain. Indeed any processing described in the impulse response domain in the present specification may, where appropriate, be replaced by equivalent processing in the raw signal domain, or in any linear transformation of the raw signal domain or the impulse response domain (e.g. fractional Fourier domain, wavelet domain). Where appropriate, non-linear transformations, such as envelope or logarithmic envelope transformations can be used to better distinguish between said first and second received signals, either separately, or in combination with the raw signal domain and its linear transformations.

In both the foregoing aspects of the invention the method preferably comprises defining a plurality of time frames corresponding to a sampling window and further defining a matrix of impulse responses, with impulse responses for adjacent time frames adjacent to each other. In such a matrix objects will be represented by patterns corresponding to the impulse responses arising from reflections from those objects in successive time frames.

The matrix could be a logical construct comprising data recorded in a memory or other storage medium of a computing device; equally it can be seen as an image, with the values of the matrix corresponding to brightness levels in the image. The sampling scheme and so matrix is preferably rectangular, however this is not essential. It could be a different shape such as hexagonal or the heights of adjacent columns may vary (i.e. the length of the sampling window may vary), not necessarily according to any simple geometric pattern. In general the matrix is made up of samples of the impulse response at different times, where the impulse response is itself a function of time.

The Applicant has realised that by organising the impulse responses such that they can be represented as an image (whether or not they in fact are so represented), powerful analysis of the image can be employed to deduce useful information about the object(s) such as presence, movement and changes in shape, size, orientation etc. When such analysis is discussed hereinbelow reference will be made to impulse response images; however it should be understood by those skilled in the art that such analysis can equally be carried out on data in a matrix, whether it is stored as such or whether it is a purely logical construct, and that nothing herein should be construed as inherently limiting the invention to requiring production of an actual image or any other representation.

In some known systems object tracking is carried out by comparing consecutive pairs of reflected signals (e.g. by comparing their phase) This can be thought of as the "raw signal" domain. The Applicant has appreciated however that by carrying out tracking in the impulse response image domain in accordance with some preferred embodiments of the invention, significant advantages can be realised. For example there is less of a requirement to separate a large number of small pulses or to find leading edges of waves than there is when operating in the "raw signal" domain. The preferred embodiments of the invention allow an overview of a 'scene' to be taken which then allows better qualified estimates to be made of the identity of parts of the image with the particular objects and their movement, as opposed to simply carrying out a 'search' operation at any given time.

The patterns in the impulse response 'images' corresponding to objects and their movement will typically be made up of the impulse responses from a number of consecutive time intervals. This allows more accurate and reliable analysis of trends within the image, which in turn allows reliable identification, location and/or tracking of objects. In some embodiments of the invention the impulse response images allow multi-frame motion estimation to be conducted—that is motion estimation where motion is not simply computed from frame-to-frame and then possibly averaged over the frames, but rather wherein the motion is computed using several frames right from the start.

Impulse response images also allow motion estimation where possible movements are computed for multiple objects and/or multiple pixels within a single object, whether it is computed for pairs of impulse response or for multiples: multi-pixel/multi-candidate motion estimation. Such motion estimation may use impulse response samples from two or more consecutive time frames. In practice, our research has shown that different points on the surface of the object can have different motion patterns due to the size and orientation of the object. If, for instance, a hand is moving along a straight line with constant speed closely in front of a receiver/transmitter setup, a reflective point or partial object on one side of the hand does not have the same series of distances to the receiver/transceiver setup as a point or a partial object on the other side does.

In accordance with the invention there may be more than one object of interest or the object of interest could change during tracking. For example the movement of two hands could be tracked.

By contrast, prior art techniques are based on computing the phase delay of a signal from one frame to the next. This assumes that there is a single, "average" phase delay which is representative of the object as a whole. However the Applicant has found that this is often not an accurate assumption, depending on the shape of the object being tracked. Ambiguities can result, such as unwanted artefacts on the tracking curves, which can lead to confusion about the motion of an object position and hence to incorrect position estimation, particularly when 2D or 3D positions are computed.

The initial signal could take any desired form. Preferably it is periodically repeating. The repetition period defines a time frame which typically corresponds to the impulse response sample period—that is the 'slices' which are used to construct the impulse response image. The signal within each time frame could take any form. In a simple embodiment it could comprise a single impulse or spike, i.e. approximating a Dirac delta function within the limitations of the available bandwidth. This has some advantages in terms of requiring little, if any, processing of the 'raw signal' to calculate impulse responses (in the theoretical case of a pure impulse, no calculation is required). It also allows for easy computation of cross-correlations between consecutive pulses since the impulse response matrix is very sparse (i.e. is mainly zeroes). However narrow pulses give a poor signal-to-noise ratio because of the deliberately short transmission.

In other embodiments the signal could be a series or train of pulses. This gives a better signal-to-noise ratio than a single pulse without greatly increasing the computation required. Moreover it allows simple amplifiers to be used since a high degree of linearity is not required. Another possibility would be to use a signal which might be at a constant frequency but in which the phase of the signal varies cyclically—e.g. in a pattern which changes each time frame. In other embodiments the signal comprises one or more chirps—i.e. a signal with rising or falling frequency. These give a good signal-to-noise ratio and are reasonable for calculating the impulse responses using a corresponding de-chirp function applied to the 'raw' received signal. More generally a random or pseudo-random signal could be used. The signal could fill the time frame—so that transmission is continuous—or be shorter than the time frame so as to transmit discontinuously.

The patterns in the impulse response image or matrix will of course be affected by the time shift function applied to the transmit signal. However this can be used to avoid confusion between objects at different ranges. One way of doing this will be described below.

The range-dependent effect of the time-shift function on the received signals can be used by itself to distinguish between objects. In preferred embodiments however in which impulse responses are calculated, an inverse of the time-shifting function is applied to the calculated impulse responses. The order of applying the inverse, calculating the impulse responses and constructing an impulse response image is not essential. For example the inverse can be applied to the columns of the impulse response image, i.e. in 'image domain', or as an intrinsic part of the impulse response estimation process.

When applying the inverse function it must be decided what time delay to use between the time-shift function applied to the transmitted signals and the inverse function applied to the received signals. This time delay equates to an assumption as to the time of flight of the received signals. Received signals that fit with the assumption will therefore have the effect of the time-shift function substantially cancelled, whereas those that do not fit with the assumption will not have this effect cancelled. The result is effectively to 'focus in' on a particular range, bringing greater clarity to impulse responses from the range in focus at the expense of impulse responses from other ranges.

In the context of impulse response images the time-shift function adds additional structure to lines representing objects, whereas the inverse function removes that structure again, but only for those that fit with the range assumption.

The range assumption in the context of impulse response images equates to a decision as to whether the time of flight is within the sampling window, represented by a time frame, or within two time frames, three time frames etc. After application of the inverse function, impulse responses for objects within the 'focal range' will be relatively well-defined lines—e.g. straight horizontal lines if the object is stationary. Impulse responses for out-of-range objects will by contrast still be more 'smeared out' depending of course on the nature of the time-shift function applied.

Thus knowledge of the pattern of variation applied to the transmit signal, i.e. the time-shift function, can be used to separate the echoes from a near object from those from a far object since the corresponding pattern of the echoes from the far object will exhibit a shift in time compared to those from the near object (due to the longer time of flight). This shift between the patterns of the impulse responses for near and far objects could be analysed directly using a suitable technique but by applying the inverse function, such analysis is much easier. For example relatively simple filters might be used.

The 'focussing' described above can not only be used for the object of interest or one of the objects of interest but also for background objects. This effectively allows a background object to be identified which then allows it to be accounted for, e.g. by subtraction, a weighting function or simply ignoring it, when tracking an object of interest.

Any suitable pattern of variation could be used for the time-shift function, for example a simple periodic pattern, such as a sine wave, square wave or saw-tooth pattern. So to take a simplistic example of a regular chirp and a sine wave variation, without applying any of the methods in accordance with the present invention, each transmission might be made at the same point in its time frame (the time frames being of equal length). In this example embodiment of the invention however transmissions would be made at different points within the respective time frames, so that the interval between given transmissions varies with time in the sine wave pattern.

Preferably however a more complex time-shift function is used—e.g. one based on a pseudo-random sequence. Such a sequence might be effectively non-repeating (over any practicable timescales), or might repeat on a relatively short period—e.g. every 5 to 50 frames; e.g. every 30 frames. In a set of embodiments the time-shift function does not repeat within a time period equal or greater to the round-trip time-of-flight for the most-distant anticipated echo (which may be calculated using the dimensions of a room in which the apparatus is being used, for example). Alternatively, a true random sequence may be used (derived, for example, from a source of radioactive decay); however, in this case the inverse shifts to be applied to the received signals will have to be calculated from the sequence of random time shifts, since corresponding inverse shifts cannot be independently calculated.

The use of a more complex time-shift function is advantageous as it gives the corresponding impulse responses the characteristics of general noise, but of course with the advantage that the exact pattern of the 'noise' is known. This allows the inverse to be applied to produce a 'clean' impulse response for an object from the desired range but the impulse responses from outside the range will still have general noise characteristics after application of the inverse. This makes it relatively easy to filter them out using general noise reduction filters and the like.

Sometimes it will occur that old reflections from far-field objects will happen to overlap reflections from a near-field object—because the objects are separated by an exact multiple of the time frame length. In its preferred embodiments the invention makes it easier to separate the reflections—e.g. by reinforcing the wanted reflection and 'smearing out' the unwanted reflection. However the Applicant has also devised a beneficial technique that can further improve separability of wanted and unwanted impulse responses in this situation. A set of preferred embodiments therefore comprises changing the length of the time frame of the initial signal between two adjacent frames. Taking the example of a periodic pulsed initial signal, this would equate to changing the 'base' time between pulses, as well as, in accordance with the time-shift function, changing the timing of the individual pulses relative to the base. Changing the time frame length also changes the number of samples per window and so the length of a column in the impulse response image.

The advantage of changing the frame length is that it moves the unwanted echo in the impulse response image whilst leaving the wanted one unmoved—in other words it acts to separate the two images. This can be understood by considering the basis of the original problem—separations equivalent to an exact multiple of the frame length. If the frame length changes, that equality would no longer hold for a given object separation.

The change in frame length could occur just once or a plurality of changes could be applied. A plurality of changes could be made automatically, but in some preferred embodiments changes to the frame length are made when required to resolve two superimposed echoes. Thus the time frame length can be automatically progressively changed until a satisfactory separation of two images has been achieved.

Where the initial signal is discontinuous (i.e. the signal does not fill each frame) the change in frame length might be accommodated by having shorter or longer gaps. Where the initial signal is continuous, changing the frame length requires a change in the initial signal itself (either adding a portion to each time frame to match a lengthening; or removing a portion to match a shortening) but this can easily be accommodated—e.g. by having a bank of codes, one for each frame length.

The 'focussing' technique outlined previously effectively allows better spatial resolution since it allows an increase in the update rate, corresponding to a reduction in the spatial range corresponding to a sampling time frame. However in accordance with the invention the reflections from different time frames can be resolved rather than being ambiguously superimposed on one another.

As mentioned above, in accordance with the invention in some of its embodiments, techniques for identifying an echo from an object of interest can be applied to echoes from other objects. By identifying such echoes, they can be more effectively compensated for or disregarded when analysing an echo pattern containing an echo from the object of interest. This 'background object' identification could be carried out in a separate phase, e.g. an initiation or setup phase, or at the same time that a target object is being tracked.

Thus in some preferred embodiments, the methods of the invention further comprise the step of identifying a contribution to the second received signals from an object other than an object of interest. For example the impulse responses corresponding to the reflections from a non-target object could be subtracted from an impulse response image.

The subtraction may comprise applying the inverse of the time-shift function to the impulse response image such that reflections from a static object in a first time-of-flight range would be represented by a predetermined line in the image, applying a filter to determine the presence of an object not being a target object, subtracting from the impulse response image a contribution related to the non-target object.

Alternatively, in embodiments in which the time-shift repeats regularly, the subtraction may comprise comparing two blocks of impulse response columns, separated from one another by the period of the time-shift repeat, identifying a pattern that is present in both blocks and subtracting that pattern from the impulse response image. The pattern may be subtracted from the image every time-shift repeat. In a set of embodiments the two blocks and the pattern are the width of the time-shift repeat. In this way, reflections from static objects, and any other source of constant of background noise, can be removed from the impulse response image.

Alternatively, a single moving-mean (rolling-average) impulse response column may be calculated. Such a column could be updated periodically (preferably every time frame) by vertically shifting two or more columns of impulse response taps with respect to one another by a vertical shift amount and calculating the mean of the two aligned columns. The moving mean column can then be subtracted from the impulse responses, e.g. once every time frame or matrix column. The vertical shift amount is preferably determined from the inverse time shift function. This would have the effect that a static object in a time-of-flight range of interest (the 'depth' of the range being equal in time to one time frame) would be represented at the same vertical position in each column. This is an alternative approach to that described in the preceding paragraph, but can give similar results.

In the arrangements described above, instead of simply subtracting parts of the signal or impulse response relating to unwanted echoes, a weighting function could be used instead to give a different weighting to the parts identified as corresponding, or likely to correspond to, unwanted echoes.

Of course in practice the received signals will be subject to a certain degree of real noise. In preferred embodiments a low-pass filter is applied to the impulse response images after the inverse time-shift function has been applied. This helps to filter out reflections from other objects and a proportion of the real noise. Of course rather than applying an inverse function followed by a low-pass filter a customised filter could be applied that was effectively equivalent to this.

In a practical situation, all or some of the reflecting objects are likely to be moving. The result will thus be that the lines in the impulse response images (after application of the correct inverse function) would not be horizontal, but rather would be e.g. at an angle to the horizontal dependent on velocity in the direction of the reflection. In such cases, a band-pass filter in the horizontal direction, or a general two-dimensional band-pass filter, could be employed which would allow for some divergence from a horizontal and/or straight line whilst still allowing an object to be tracked. In some preferred embodiments however the motion is preferably detected, and an appropriate line filter, aligned with the direction of movement of the object applied. The motion could be detected by analysis of the received signals—e.g. using a gradient detection algorithm, or by another method— e.g. using Doppler shift. The process of detecting the line of motion and filtering with respect to it is, in some sense, a circular problem, since to filter in the line of motion requires knowledge of the line of motion, and this knowledge stems from roughly at least, successfully tracking the curves. Nevertheless, in many practical situations, enough information about the main motion tendencies can be extracted from the images without prior knowledge.

The Applicant has appreciated that with an appropriate choice of time-shift function, the 'noise' added to reflections which are not in the focus range can be made to resemble apparent movement of the reflecting object which is not physically possible or within the predefined boundaries for expected objects. For example for a hand tracking system movements upper bounds can be placed on speed and acceleration. These upper bands can be quite low given the physical characteristics of hand movements. Thus some preferred embodiments comprise determining a motion characteristic, such as speed or acceleration, implied by a particular impulse response and comparing said characteristic against a threshold or set of expected characteristics and disregarding or removing/filtering out the corresponding part of the impulse response if no positive match is made.

Similarly in some preferred embodiments the expected set of real movements comprise only low-frequency components in the horizontal direction of the impulse response image, thus some preferred embodiments comprise applying a Fourier transform, e.g. a fast Fourier transform to the impulse response image obtained after the inverse of the time-shift function has been applied. Thereafter a test can be applied depending on the frequency composition of a candidate portion of the impulse response image to determine whether or not it relates to an object of interest.

As well as locating or tracking an object, the techniques of the invention can be used for the more general application of estimating the impulse response of channels. An exemplary application of this might be to track sound sources in a soundscape—e.g. to allow post-processing to isolate a particular speaker from a soundtrack.

Thus when viewed from another aspect the invention provides a method of estimating the impulse response of a channel comprising transmitting a time-shifted signal and distinguishing between the received echoes of different reflections by comparing the time-shifts of the received signals with the transmitted signals.

The invention extends to apparatus for estimating the impulse response of a channel comprising a transmitter arranged to transmit a time-shifted signal processing means arranged to distinguish between the received echoes of different reflections by comparing the time-shifts of the received signals with the transmitted signals.

The invention also extends to a computer software product, and a carrier bearing the same, configured, when run on a computer, to control a transmitter to transmit a time-shifted signal; said software further comprising logic arranged to distinguish between the received echoes of different reflections by comparing the time-shifts of the received signals with the transmitted signals.

In a set of preferred embodiments the methods described herein are used to track the motion of a human hand or part thereof. Preferably this is used to control an electronic device, including but not limited to a device with a visual display, such as a computing device, mobile device, cell phone, PDA, laptop computer, desktop computer, television, music system, video camera, or any device, static or portable performing any combination of these or other functions. One particular, non-limiting example is tracking the movement of a user's finger to control a cursor on a computing device or other device with a graphical user interface (GUI).

In one set of particularly preferred embodiments a method in accordance with the invention comprises the step of identifying a hand gesture. There are many possibilities for these gestures—a few examples of which will be given below. It will be apparent however to those skilled in the art that there are many possible alternatives which the principles and advantages that can be achieved in accordance with embodiments of the invention make convenient or possible.

In one example the system is arranged to detect two fingers moving together or apart (i.e. converging or separating). Of course the mapping of particular gestures to the control of functions can be decided according to the particular application. However this gesture could conveniently be used for example to indicate that a screen object is to be zoomed out or in respectively. In a preferred example the aforementioned gestures are identified from different direction movements in respective halves or portions of an impulse response image. It will be appreciated that in accordance with this embodiment of the invention, such identification can be successfully carried out since the impulse response image allows motion identification with a relatively crude level of spatial resolution. Moreover, it is not necessary to determine the exact positions of any of the fingers of the hand. Instead, only the relative separating or converging need be determined using a 'probabilistic tracking' approach (in contrast to precise 'deterministic tracking'). Some pre-filtering of the image could be used—e.g. by identifying areas of high reflection energy likely to correspond to finger tip movement.

The transmissions in accordance with any aspect of the invention could be of any type e.g. radio waves, microwaves, infra red; but preferably they are ultrasound—i.e. preferably sonic waves with a frequency (or median frequency) greater than 20 kHz, preferably greater than 30 kHz.

In all of the methods herein, the results are preferably stored in a volatile or non-volatile memory. Additionally or alternatively they are displayed on a display device. They thus preferably comprise the step of providing a display signal for a display device. Additionally or alternatively the methods are used to control an external device. They thus preferably comprise the step of providing a control signal for an external device.

The methods of the invention are preferably carried out using computing means, computing machines, data processing apparatus or any other device capable of carrying out stored instructions. Such a devices may be static although the invention can equally be used with mobile devices. Indeed the advantages achievable in accordance with at least some embodiments of the invention of being able to separate different motions make it particularly suitable for use in mobile devices. When viewed from another aspect therefore the invention provides a mobile device comprising an ultrasonic transmitter and separate/integrated ultrasonic receiver, said device being configured so that at least one operation thereof is controlled by determination of the movement of a user's hand in accordance with any of the methods set out hereinabove.

Whilst reference is made herein to arrangements in which signals are transmitted, reflected by an object and then received, the principles apply equally to 'active objects' i.e. where the object being detected or tracked itself includes a transmitter so that the signal originates from the object rather than being reflected by it.

Features described above with reference to certain aspects of the invention are not to be understood as being limited to those aspects only, but, where appropriate, may be applied to any of the other aspects of the invention.

Certain preferred embodiments of the invention will now be described, by way of example only, with reference to the accompanying drawings, in which:

FIG. 1 is a schematic diagram showing apparatus suitable for use with methods of the present invention;

FIGS. 2*a* to 2*d* are diagrams illustrating a problem with prior art methods;

FIGS. 3*a* to 3*e* are diagrams indicating an improvement achieved through use of an embodiment of the invention; and FIGS. 4 and 5 are schematic diagrams illustrating in more detail how an embodiment of the invention works in principle.

Turning first to FIG. 1 an exemplary implementation of the principles of the invention to the touchless control of a graphical user interface of a computer, will be described. A signal generator 2 generates a periodically repeating ultrasonic frequency 'chirp' signal. This signal is passed to a signal processor and a pseudo-random time-shift function is applied to it. This shifts parts of the signal in time relative to other parts of the signal. The shifted signal is then converted to ultrasonic waves by an ultrasonic transmitter 4. These waves bounce off an object 6 to be tracked, such as a hand, as well as bouncing off other, more distant obstacles (e.g. the user's torso). The reflected energy is received by one or more ultrasound receivers 8 which convert the energy back into analogue electrical signals which are passed to a processor 10. As will be explained in greater detail below, the processor 10 computes impulse responses, applies the inverse of the time-shift function, and carries out filtering so as ultimately to determine the motion of the object 6. The information about the presence and position of the object 6 is passed to a display 12 for controlling the movement of a cursor 14. The display could be a separate system or indeed part of the computer on which the processor 10 is provided. The cursor 14 reproduces the motion of the object on the screen.

The processor 10 is coupled to the signal generator 2 in order that it can apply an accurate inverse of the time-shift function.

The analogue signals output by the ultrasonic receiver 8 are used to calculate 'impulse responses' for the 'channel' comprising: the ultrasonic transmitter 4, the imaging field containing the object of interest 6 and the ultrasonic receiver.

One way of estimating the channel impulse response is to drive a short impulse into the signal and listen to received echoes and direct path energy being received. However, as it might be difficult to transmit such a signal without giving the transmitter a 'shock', containing frequency components outside the band in which the impulse response estimate is sought. Other techniques might be more appropriate such as transmitting a pseudo-random or a chirp signal which has a gradual raise or decay in frequency.

It may first be assumed that the transmission of a signal over a channel follows the following model;

$$y(t)=h(t)*x(t)+n(t) \quad \text{Eq (1)}$$

where:
x(t) is the signal transmitted
y(t) is the received signal
h(t) is the channel's impulse response
n(t) is an environmental noise term
* denotes a convolution operator The transmitted signal is represented as a time series—that is to say a series of discrete signal values at regular time intervals. The received signal is also represented as a time series since it will be a sampled signal. The impulse response h(t) is what is being sought to be measured. It is assumed that the channel h(t) is constant or changing very slowly relative to the changes in x(t) and y(t), at least within any actual time-window used. That is not to say that time-varying channels cannot be measured, indeed in at least its preferred embodiments the invention is concerned with how a channel varies over time; it is just that the channel variation should be slow compared with the signal variation.

The channel can be represented as a Q-tap finite impulse response (FIR) filter. As is well known in the art this is a construction in which the channel h(t) is seen as a series of weights to be applied to the previous Q time samples of the input signal. Assuming a signal x(t) has been transmitted through a loudspeaker, it is received through a microphone again as y(t). The received signal y(t) is taken to relate to the transmitted one x(t) as follows:

$$y(l) = [x(t) * h(t)](l) = \sum_{k=0}^{K-1} x(l-k)h(k) \quad \text{Eq(A)}$$

That is, a sample of y(t) is a linear combination of the K last samples of x(t) where the linear weights are given in the "filter coefficients" h(0), ... h(K−1). To estimate the channel, it is necessary to estimate these filter coefficients. In this technique the assumption is made that the signal x(t) is, for all t from minus infinity to plus infinity, "white". In other words it is assumed that the signal is uncorrelated with itself for all non-zero shifts. Expressing this in an equation:

$$[x(t) * x(-t)](l) = \sum_{k=-\infty}^{\infty} x(l-k)x(-k) \quad \text{Eq(B)}$$

$$= \sum_{k=-\infty}^{\infty} x(l+k)x(k)$$

$$= \begin{cases} P & \text{if } l = 0 \\ 0 & \text{otherwise} \end{cases}$$

where P is a real, positive number, assuming that x(t) has finite support, i.e. it is zero for large +/− values of t, and has finite values elsewhere. Convolving a signal with its own time-reverse is the same as correlation with the signal itself, i.e. computing the auto-correlation of the signal. So assuming that x(t) is indeed white, correlating x(t) with itself yields a positive value P for a time lag of 0 and zero everywhere else. Another way of writing this is:

$$x(t) * x(-t) = P \cdot \partial(t) \quad \text{Eq (C)}$$

where $\partial(t)$ is the Dirac delta function. It is now assumed that Eq (B) also holds approximately around a point $t_0$ in time, with a length of N+1 samples and a time-window of x(t), so that:

$$[x(t) * x(-t)]_{t_0}(l) = \sum_{k=-N/2}^{N/2} x(l+t_0-k)x(t_0-k) \quad \text{Eq(D)}$$

$$= \sum_{k=-N/2}^{N/2} x(l+k+t_0)x(k+t_0) \approx$$

$$\begin{cases} P & \text{if } l = 0 \\ 0 & \text{otherwise} \end{cases}$$

Convolving y(t) with x(−t) around $t_0$ gives:

$$[y(t) * x(-t)]_{t_0}(l) = \sum_{k=-N/2}^{N/2} y(l+t_0-k)x(t_0-k) \quad \text{Eq(E)}$$

and calculating the inner term in the sum gives:

$$y(l+t_0-k) = \sum_{i=0}^{K-1} x(l+t_0-k-i)h(i) \quad \text{Eq(F)}$$

and hence:

$$[y(t) * x(-t)]_{t_0}(l) = \sum_{k=-N/2}^{N/2} \sum_{i=0}^{K-1} x(l+t_0-k-i)h(i)x(t_0-k) \quad \text{Eq(G)}$$

$$= \sum_{i=0}^{K-1} \left[ \sum_{k=-N/2}^{N/2} x(l+t_0-k-i)x(t_0-k) \right] h(i) \approx$$

$$P \cdot h(l)$$

As can be seen from Eq (D) above, the term in the brackets in Eq (G) is P (approximately) if and only if l=0 and (approximately) 0 otherwise. Hence by choosing l=1, the outcome of the convolution $[y(t)*x(-t)]_{t_0}$ (l) will be P times h(1), if l=2, then it is P times h(2) etc. In this way, the filter coefficients h(.) can be estimated by convolving windows of x(t) with windows of y(t) around a certain "centre" time sample $t_0$.

The impulse responses, e.g. calculated as above, for a series of adjacent time-slots can then placed adjacent one another to form an impulse response image. A visual representation of a simple impulse response image is shown in FIG. 2d. In a practical system such a visual representation would probably not actually be needed since the relevant analysis can be carried out on the calculated impulse responses without displaying them. Each vertical column of pixels in the image represents one sampling window or time-slot. Thus the vertical scale is filter tap number. The horizontal scale is sample number. The impulse response image can therefore be thought of as the result of chopping up a continuous time line of impulse responses in lengths equal to the length of the sample window, and placing the lengths next to each other.

FIGS. 2a to 2d illustrate the problem of interference between echoes from objects at different. FIG. 2a shows an example transmission signal 20. This shows a regularly repeating pulse 22 emitted at the beginning of each time frame (marked by respective vertical bars). FIG. 2b shows the impulse response of the system to just the first pulse 22 shown in FIG. 2a. It can be seen that the first pulse 22 generates a main echo 24 (from a nearby object) which appears in the first frame, and a weaker echo 26 (from a more distant object) which appears in the next frame. This demonstrates that if an impulse signal was produced starting at time t=0, one echo 24 would be received within the first time frame (here with frame length, N of 50 taps), and another echo 26 would be received in the second the second frame.

However, FIG. 2b is artificial as it only shows echoes from the first pulse 22. Of course, as FIG. 2a shows, there are in fact a regular series of pulses. The result of such repeated transmissions is shown in FIG. 2c. The first peak in each time frame is the effect of the stronger echo 24 from the nearby object. The second peak 30 is the effect of the weaker echo 26 from the transmitted pulse of the previous frame which is actually "delayed" relative to the first echo 26 by a time, t which is more than a full frame length. Since the transmitted pulses 22 are strictly periodic, the time t between the near and far reflections of a given pulse remains constant, albeit that they appear in different time frames. When the resultant signal is chopped into lengths of N=50 samples and each such window arranged as a column in matrix, the pattern in FIG. 2d emerges, with two straight lines 32, 34. The first line 32 corresponds to the first, strong echo 24 from the near object, whereas the weaker line 34 below it is from the much more delayed weaker echo 26 of the pulse prior to the one that produced the first line 32.

Two problems potentially arise. The first problem is that the lines are ambiguous—it is impossible to determine whether say the second line 34 corresponds to an object just slightly further away than the nearer object (as first appears from FIG. 2d), or whether it is a older echo from an object much further away (as is in fact the case in the example here.

In this example the distant echo 26 is more than a full frame length away so that at least the two lines 32, 34 are distinct from one another. However if the separation of the near and far objects should be such that it the ultrasonic time of flight approaches a whole multiple of the frame length, another problem arises. In this case the lower line 34 could actually be superimposed on the first, making it impossible to measure the precise position of either line.

FIGS. 3a to 3e show how the situation is improved in accordance with an embodiment of the invention. FIG. 3a shows that in this embodiment the transmitted signal 36 differs from the prior art transmit signal 20 in that the positions of the pulses 38a, 38b, 38c relative to the beginning of the frame change from frame to frame. This is the result of applying a time-shift function to an initial signal like that shown in FIG. 2a. It can be seen from FIG. 3b that the impulse response of the first pulse 38a again extends across two time frames as it did in FIG. 2b, because of the reflections from near and far objects.

FIG. 3c shows the aggregate plot of the impulse responses from each of the modified series of pulses 38a,b,c. As in FIG. 2c the strong, near-field reflections 40 and the weak, far-field reflections 42 can be seen in each time frame. Taking the second time frame for example, this includes the near-field reflection 40b from the second pulse 38b and the far-field reflection 42a from the first pulse 38a. However it can also be seen that in moving from one time frame to the next the separation of the near- and far-field reflections 40, 42 varies. This is shown more clearly in FIG. 3d when the resultant signal is chopped up in signal segments which are combined to become an impulse response image. The effect of the time-shift function can be seen on the short range echo line 44 and the long range echo line 46. The effect however is different on each line 44, 46 which is explained by the different times of flight each line represents and so the different delays that each has relative to the transmitted signal. Because of this the lines 44, 46 are not parallel.

The time-shift function affects the lines 44, 46 in the impulse response image since the impulse responses are calculated as if the signal transmitted had been the original signal, i.e. before the time-shift function had been applied. Since movements from a flat line in an impulse response image would normally correspond to movement of the object from which the signals are being reflected, the effect of the time-shift function can be seen as adding an 'artificial movement' to the objects in question but with the actual movement for a given object being dependent on its position from the transmitter and receiver.

FIG. 3e shows the result of applying the inverse of the time-shift function to the impulse responses with a delay equal to one time frame—i.e. based on the assumption that the reflection has come from an object such that its time of flight is within a single time frame. Now it is seen that the reflections which do come from the nearby object, consistent with the assumption, appear as a straight horizontal line 44'. This can be thought of as the reflection which is coherent with the inverse time-shift function. On the other hand the incoherent far-field reflection line 46' remains fluctuating (albeit in a different manner from prior to application of the inverse function). By applying for example a horizontal filter or a horizontal moving average filter to the image after this step, the short range (coherent) reflection would be strengthened and the far range (incoherent) one weakened. Thus the time-shift function allows the impulse responses from the reflections at different distances to be unambiguously resolved.

Continuing the analogy from above, applying the inverse function to the impulse response image is akin to applying a similar 'artificial movement' to the whole image. This means of course that for the near-field reflection the movement is cancelled out and it appears stationary, whereas for the far-field one, relative 'movement' remains.

Of course, the description above is simplified for clarity of explanation. In practice many different, and more complex, initial signals could be used, for example a chirp or pseudo-random sequence. If for instance a chirp was applied, then the signals shown in FIGS. 2c and 3c could be regained by cross-correlating with this chirp. If say a signal other than a chirp were used, e.g. a pseudo-random code, then cross-correlation or inversion techniques such as those disclosed in WO 2006/067436 could be used.

The transmit signals could even be continuous. The modification of the signal by the time-shift function would then be a continuous modification function, moving some portions of the signals forwards in time and some backwards.

In any case the time-shift function needn't be a slowly varying smooth function, but could be pseudo-random. Indeed this is preferred since then variation of the line in the impulse response images is less likely to be confused with a genuine motion of the object of interest. Ideally therefore the time-shift function should correspond to an 'unphysical' motion.

In another embodiment (not shown) the wanted and unwanted reflections could be moved apart in the impulse response image by changing the frame length—i.e. the average periodicity of the initial signal and the sample length, e.g. from N=50 to N=47. This would have the effect of moving the lower, far field reflection line 46 and leaving the upper line 44 unchanged. This is clearly of greatest benefit when the two lines 44, 46 overlap.

FIG. 4a shows the ideal impulse response image for a slowly-moving object as it would have appeared if focus was on this distance, and no other echoes were present. FIG. 4b shows an interfering echo, which relates to a stationary object which is approximately one frame length further away than the object of interest yielding the IRI in (a).

Figure 1:
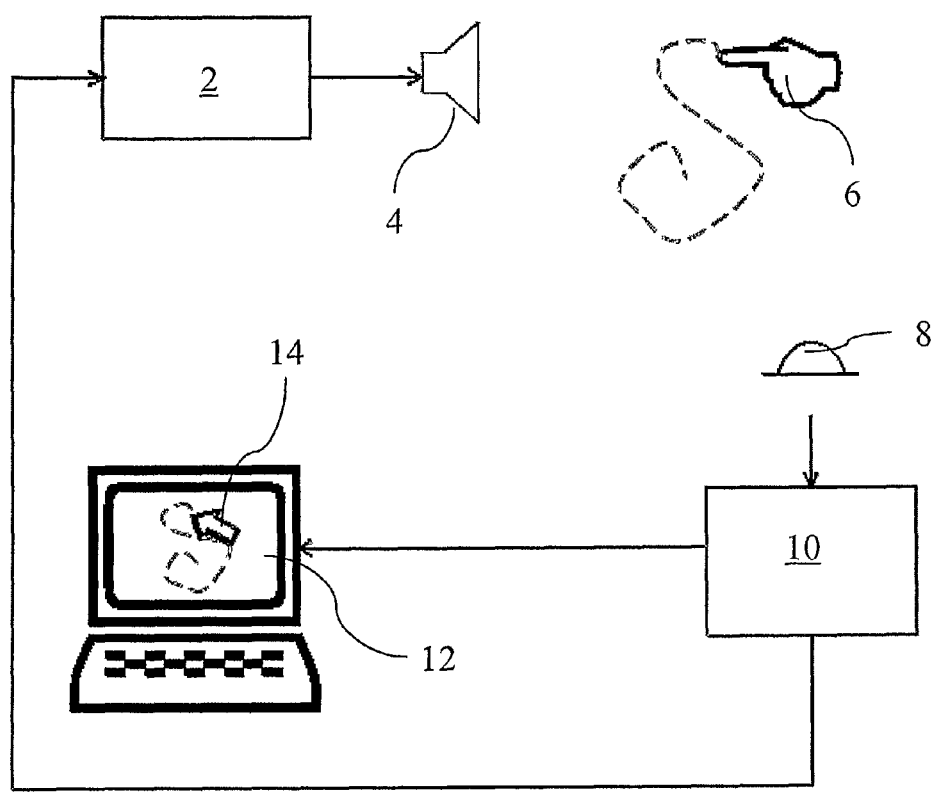
Figure 4:
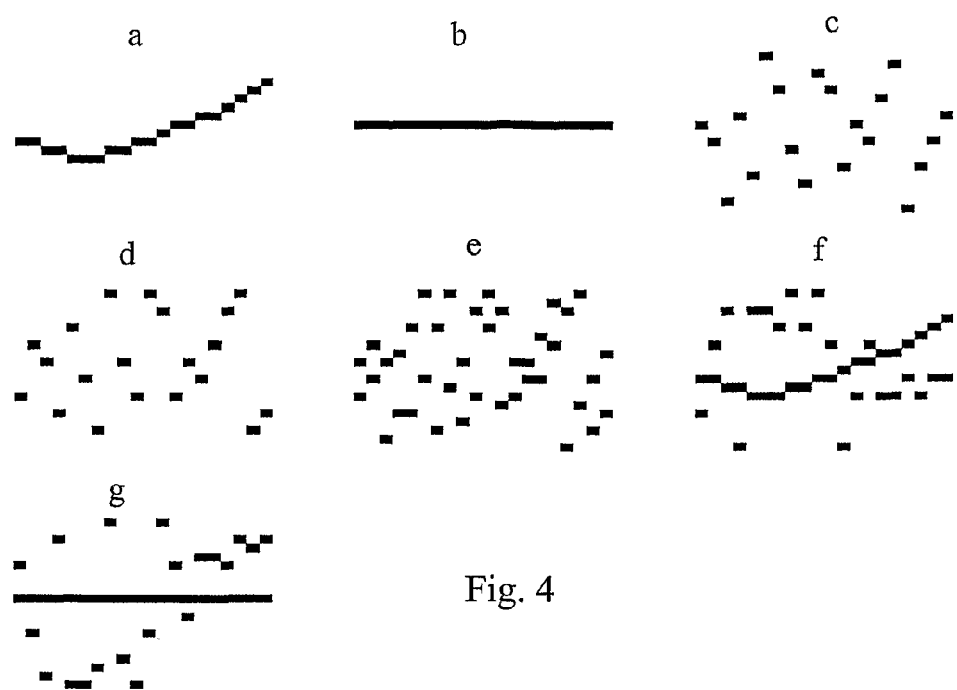
FIG. 4 illustrates through a series of impulse response image (IRI) fragments how the mathematics of the shifting and inverse shifting process is developed. For simplicity, schematic black and white impulse response images are used, indicating a set of situations where an object has no 'grading', i.e. there is a 0 in the impulse response if there is an echo, and 1 if there is one.

FIG. 4c shows the effect on the impulse response image in FIG. 4a of applying a time-shift function to the transmit signal. FIG. 4d shows the effect of the same function on the IRI of FIG. 4b. These can both be thought of as transformations of the images in FIGS. 4a and 4b respectively. If the image/matrix in FIG. 4a is denoted $I_1$, then the transformed image in FIG. 4c can be denoted $T_1(I_1)$. Similarly, if the image in FIG. 4b is denoted $I_2$, then the transformed image shown in FIG. 4d can be denoted $T_2(I_2)$. What will actually be observed by the impulse response image generation process is the superposition of the two:

$$T_1(I_1)+T_2(I_2)$$

This is shown in FIG. 4e. The reason why the two transforms $T_1(.)$ and $T_2(.)$ are different from one another is as follows: $T_1(.)$ effectively shifts the columns of its argument image according to the sequence pattern used for shifting, and this repetitive sequence can be denoted: $S\{1+(Q \bmod N)\}$, for any Q and with a sequence length N.

$T_2(.)$ on the other hand, will shift the columns according to the sequence $S\{1+(Q+1 \bmod N)\}$. This is because the echoes coming from the further distance frame will relate to signals that were transmitted one time-step earlier, i.e. they are reflections of "earlier signals".

Having observed the superposition of images, the inverse transformation $T_1^{-1}(.)$ and $T_2^{-1}(.)$ can be applied to "focus in" on the relevant ranges. FIG. 4f shows the result of applying, the transform $T_1^{-1}(.)$, giving the resultant image $$T_1^{-1}\{T_1(I_1)+T_2(I_2)\}=I_1+T_1^{-1}\{T_2(I_2)\}$$

This follows from the linearity of the operator, apart from possible clipping at the tops and bottoms of the images, which here are assumed to be negligible. It will be seen that applying $T_1^{-1}(.)$ to the sum of the transformed images $T_1(I_1)+T_2(I_2)$ effectively focuses in on $I_1$ while adding a noise component which is a further scattering of $I_2$.

In FIG. 4g the opposite example is shown, where $T_2^{-1}(.)$ has been applied to the sum of the transformed images.

Figure 5:
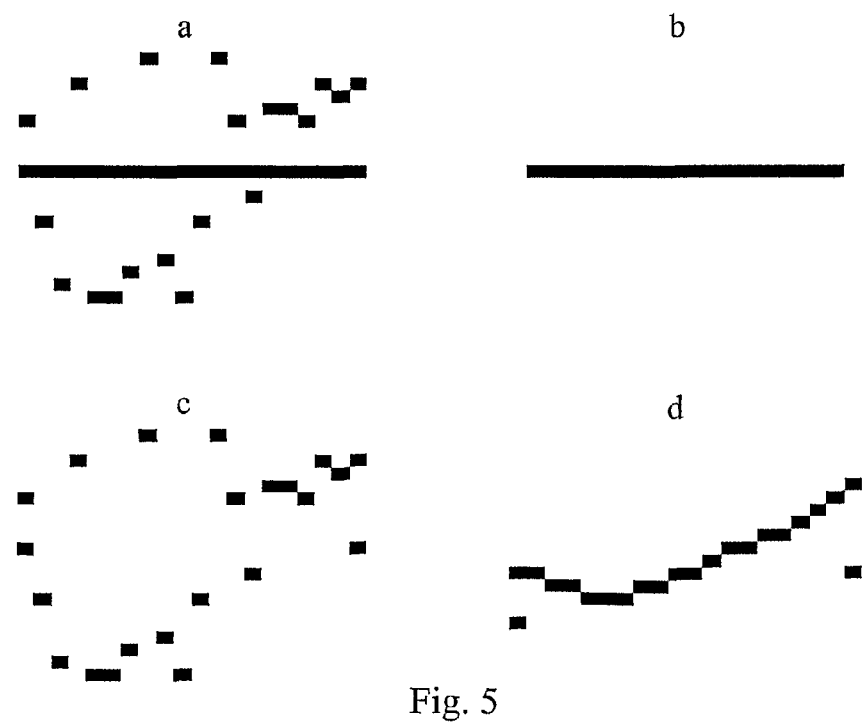

Next, filtering can be used to remove or reduce the echoes from a second range when studying an acoustic scene with focus on the first range. In FIG. 5a the focused image $T_2^{-1}\{T_1(I_1)+T_2(I_2)\}=E+I_2$ is shown once again (i.e. it is the same as FIG. 4g. Here $E=T_2^{-1}\{T_1(I^1)\}$ is the scattering error term coming from applying a (non-matching) inverse T operation to the transformed $I_1$.

Next, an outlier filter F(.) is applied to this image, removing any pixel that is not connected with two neighbours. The result is seen in FIG. 5b, which is now an estimate of the echo image from the second range, i.e.

$$\hat{I}_2=F(T_2^{-1}\{T_1(I_1)+T_2(I_2)\})=F(E+I_2)\approx I_2$$

Where $E=T_2^{-1}\{T_1(I_1)\}$ which is what the filtering operation F(.) is intended to remove. This estimate is subtracted from the original image in FIG. 5a, giving:

$$T_2^{-1}\{T_1(I_1)+T_2(I_2)\}-\hat{I}_2=E+I_2-\hat{I}_2\approx E$$

The result of which is shown in FIG. 5c. Recalling that $E=T_2^{-1}\{T_1(I_1)\}$, it is clear that by first applying to the approximate E the operation $T_2$ and next $T_1^{-1}$ succession, one would get an estimate of $I_1$, the result of which is shown in FIG. 5d. This can be seen by using the symbol $\circ$ to denote sequences of transformations and noting that $$T_1^{-1}\circ T_2\circ T_2^{-1}\circ T_1(T_1)=I_1$$

FIG. 5d shows that the (scattered) long range echo has been essentially removed from the mix. It is of course possible to carry out the same operation with respect to the closer echo, i.e. relating to the curved line, and remove it for the purpose of seeing the far range echo more clearly. In that case, as in most practical situations, a more advanced filter than an outlier-removal filter would be used. A filter bank of best-matching horizontal or close-to-horizontal line filters would be one option, adaptive filters of the image in the horizontal direction, such as using Wiener-filter, Kalman-filters or particle filters would be other options. Predictive filtering could be used, as could a fast Fourier transform (FFT) of the image followed by extracting only those components in the image yielding slow or continuous changes in the horizontal directions of the images.

This procedure could be repeated iteratively until sufficient separation has been obtained, gradually separating the distinct echo ranges more and more.

In some cases, it might not be necessary to subtract the echoes from the longer range at all, since a sufficiently advanced tracker would be able to would treat the (non-repeating) echoes added onto the echoes of interest as inherent noise.

In any case, it will be seen that by applying a time-shift function to the output signals and later inverting this effect in the impulse response domain, the echoes of interest will form a continuous line, relating to a "physically plausible motion", whereas the echoes that are not of interest will appear as scattered noise. Alternatively if the system tries to interpret the 'shifted' impulse response form a distant object as a real object close to the object of interest, it will nonetheless appear to have a "physically implausible motion". Thus, the plausibility or implausibility of the movement of an object in a scene can be used as a basis for ignoring it or removing it from a tracking task.

It will also be seen by the person skilled in the art, that since there is motion continuity and most often, a limited bandwidth of the signal, the motion of the object of interest will create an impulse response image that has slow or relatively slow variation in the horizontal direction, i.e. each line of the impulse response image will contain only relatively low frequency components unless the object is moving very fast. Thus, if no "scattered echo" is added to the clear impulse response image, it will be low-frequency image in the horizontal direction. The scattered echoes, however, will add high-frequency content in the horizontal direction. The effect of (a) applying a time-shift function; (b) computing the impulse response image; and (c) applying the inverse filter in the impulse response domain, has the effect of shifting the unwanted echoes upwards in frequency, while retaining the echoes of interest in the low-frequency range. This high/low-frequency separation provides a further basis for separating the echoes from one another.

The invention claimed is:

1. A method of estimating the impulse response of a channel comprising:
    providing an initial signal;
    applying a time-shift function to said initial signal to produce a transmit signal;
    transmitting said transmit signal;
    receiving a received signal;
    calculating a plurality of impulse responses from said received signal;
    defining a matrix of impulse responses calculated from said received signal, with impulse responses for adjacent time frames being adjacent to each other in the matrix; and
    using said matrix of impulse responses and an inverse of said time-shift function to distinguish between received signals arising from reflections from objects at different ranges.

2. A method as claimed in claim 1 comprising using the received signal to calculate a distance to an object of interest.

3. A method as claimed in claim 2 comprising storing a distance to an object of interest in a volatile or non-volatile memory.

4. A method as claimed in claim 1 comprising applying an inverse of the time-shifting function to the calculated impulse responses.

5. A method as claimed in claim 4 comprising the step of identifying a contribution to the received signal or to the impulse response from an object other than said object of interest and compensating for said contribution.

6. A method as claimed in claim 1 wherein the transmitted signal is an ultrasound signal.

7. A method as claimed in claim 1 comprising the step of providing a control signal for an external device.

8. A method as claimed in claim 1 comprising tracking an object and controlling an electronic device in response to said tracking.

9. A method as claimed in claim 1 comprising tracking the movement of a user's finger or hand and controlling a cursor on a device with a graphical user interface in response to said tracking.

10. A method of determining movement of an object of interest comprising:
providing an initial signal;
applying a time-shift function to said initial signal to produce a transmit signal;
transmitting said transmit signal;
receiving a plurality of received signals including a first received signal arising from reflection of said transmit signal from said object of interest and a second received signal not arising from reflection of said transmit signal from said object of interest and having a different time of flight to the first received signal;
using an inverse of the time-shift function to distinguish between said first and second received signals; and
using the first received signal to determine movement of said object.

11. A method as claimed in claim 10 comprising using the received signals to calculate impulse responses.

12. A method as claimed in claim 11 comprising applying said inverse of the time-shifting function to the calculated impulse responses.

13. A method as claimed in claim 12 comprising applying a Fourier transform to said received signals or a transformation thereof after the inverse of the time-shift function has been applied or as an intrinsic part of applying the time-shift function inverse.

14. A method as claimed in claim 10 comprising the step of deleting a contribution from the second received signals.

15. A method as claimed in claim 10 further comprising defining a plurality of time frames corresponding to a sampling window and defining a matrix of impulse responses calculated from said received signals, with impulse responses for adjacent time frames being adjacent to each other in the matrix; and applying a line filter to said matrix of impulse responses.

16. A method as claimed in claim 15 comprising detecting a movement of said object or one of said objects having a direction and applying a line filter, aligned with said direction of movement, to said impulse response matrix.

17. A method as claimed in claim 16 comprising detecting said movement by one or both of a gradient detection algorithm or a Doppler shift measurement.

18. A method as claimed in claim 15 comprising changing the length of a said time frame between two adjacent frames.

19. A method as claimed in claim 18 comprising automatically changing said time frame length a plurality of times.

20. A method as claimed in claim 18 comprising changing said time frame length when necessary to resolve two superimposed echoes.

21. A method as claimed in claim 10 comprising determining a motion characteristic from a subset of said received signals and performing a comparison between said motion characteristic and a threshold or set of predetermined characteristics.

22. A method as claimed in claim 21 comprising disregarding or removing or filtering-out said subset based on a result of said comparison.

23. A method as claimed in claim 10 wherein the transmitted signal is an ultrasound signal.

24. A method as claimed in claim 10 comprising the step of providing a display signal for a display device.

25. Computing apparatus arranged to carry out a method as claimed in claim 10.

26. A mobile device arranged to carry out a method as claimed in claim 10.

27. A mobile device comprising an ultrasonic transmitter and a separate or integrated ultrasonic receiver, said device being configured so that at least one operation thereof is controlled by determination of the movement of a user's hand in accordance with a method as claimed in claim 10.

28. A method of estimating the impulse response of a channel comprising transmitting a time-shifted signal in a plurality of time frames, receiving a plurality of received signals, calculating a plurality of impulse responses from said received signals; defining a matrix of said impulse responses with impulse responses for adjacent time frames being adjacent to each other in the matrix and distinguishing between received echoes of different reflections by comparing time-shifts of the impulse responses with the time-shifted transmitted signal.

29. A method as claimed in claim 28 wherein the transmitted signal is an ultrasound signal.

30. An apparatus for estimating the impulse response of a channel comprising:
a signal generator for providing an initial signal;
a signal processor for applying a time-shift function to said initial signal to produce a transmit signal;
a transmitter adapted to transmit said transmit signal;
a receiver adapted to receive a received signal;
a processor for calculating a plurality of impulse responses from said received signal, defining a matrix of said impulse responses with impulse responses for adjacent time frames being adjacent to each other in the matrix; and
a processor for using said matrix of impulse responses and an inverse of said time shift function to distinguish between received signals arising from reflections from objects at different ranges.

31. A computer software product configured, when run on a computer, to estimate the impulse response of a channel comprising:
logic arranged to control a signal generator to provide an initial signal and apply a time-shift function to said initial signal to produce a transmit signal;
logic arranged to control a transmitter to transmit said transmit signal in a plurality of time-frames;
an input adapted to receive a received signal from a receiver;
logic adapted to calculate a plurality of impulse responses from said received signal, defining a matrix of said impulse responses with impulse responses for adjacent time frames being adjacent to each other in the matrix; and
logic adapted to use said matrix of impulse responses and an inverse of said time shift function to distinguish between received signals arising from reflections from objects at different ranges.

32. An apparatus for determining the movement of an object of interest comprising:
- a signal generator providing an initial signal;
- a processor for applying a time-shift function to said initial signal to produce a transmit signal;
- a transmitter arranged to transmit said transmit signal;
- a receiver arranged to receive a plurality of received signals including a first received signal arising from reflection of said transmit signal from said object of interest and a second received signal not arising from reflection of said transmit signal from said object of interest and having a different time of flight to the first received signal; and
- a processor arranged to use an inverse of the time-shift function to distinguish between said first and second received signals and use the first received signal to determine movement of said object of interest.

33. A computer software product comprising:
- logic arranged to control a signal generator to provide an initial signal and apply a time-shift function to said initial signal to produce a transmit signal;
- logic arranged to control a transmitter to transmit said transmit signal;
- an input adapted to receive a plurality of received signals from a receiver including a first received signal arising from reflection of said transmit signal from an object of interest and a second received signal not arising from reflection of said transmit signal from said object of interest and having a different time of flight to the first received signal; and
- logic adapted to use an inverse of the time-shift function to distinguish between said first and second received signals and use the first received signal to determine movement of said object of interest.

* * * * *

UNITED STATES PATENT AND TRADEMARK OFFICE
CERTIFICATE OF CORRECTION

PATENT NO.         : 8,681,585 B2                                    Page 1 of 1
APPLICATION NO.    : 12/936175
DATED              : March 25, 2014
INVENTOR(S)        : Dahl et al.

It is certified that error appears in the above-identified patent and that said Letters Patent is hereby corrected as shown below:

In the Specification

In column 14 at line 21, Change "l=0" to --l=i--.

In column 16 at line 65, Change "$I_I$," to --$I_1$,--.

Signed and Sealed this
Ninth Day of September, 2014

Michelle K. Lee
*Deputy Director of the United States Patent and Trademark Office*